(12) United States Patent
Robinson

(10) Patent No.: US 10,203,035 B1
(45) Date of Patent: *Feb. 12, 2019

(54) JOINT SEAL SYSTEM

(71) Applicant: Schul International Company, LLC, Pelham, NH (US)

(72) Inventor: Steven R. Robinson, Windham, NH (US)

(73) Assignee: Schul International Company, LLC, Pelham, NH (US)

( * ) Notice: Subject to any disclaimer, the term of this patent is extended or adjusted under 35 U.S.C. 154(b) by 131 days.

This patent is subject to a terminal disclaimer.

(21) Appl. No.: 15/189,671

(22) Filed: Jun. 22, 2016

Related U.S. Application Data

(63) Continuation of application No. 14/630,125, filed on Feb. 24, 2015, now Pat. No. 9,404,581.

(Continued)

(51) Int. Cl.
*B32B 3/02* (2006.01)
*B32B 5/18* (2006.01)
(Continued)

(52) U.S. Cl.
CPC .............. *F16J 15/104* (2013.01); *B32B 3/02* (2013.01); *B32B 5/18* (2013.01); *B32B 7/12* (2013.01);
(Continued)

(58) Field of Classification Search
CPC ...... F16J 15/104; F16J 15/065; B32B 15/046; B32B 5/18; B32B 7/12
See application file for complete search history.

(56) References Cited

U.S. PATENT DOCUMENTS

D945,914 4/1909 Colwell
1,371,727 A 3/1921 Blickle
(Continued)

FOREIGN PATENT DOCUMENTS

CA 1280007 2/1991
CA 1334268 2/1995
(Continued)

OTHER PUBLICATIONS

Polyethylene foam article, UFP Technologies, 2018, 1 page (Year: 2018).*

(Continued)

*Primary Examiner* — Hai Vo
(74) *Attorney, Agent, or Firm* — Crain, Caton & James, P.C.; James E. Hudson, III

(57) ABSTRACT

An integral multilayer joint seal. Layers of foam, layered co-planar to the adjacent surface, are interspersed with a barrier layer which extends beyond the foam layers to provide a protective surface, a surface for attachment atop adjacent substrates, or a connecting tab for use with adjacent joint seals. The foam layers may be uncompressed or partially compressed at the time of joint formation and may be composed of open or closed, or hybrid, cell foam. The foam may be impregnated with a fire retardant or may be composed of a fire retardant material, if desired. The barrier may have a tensile strength greater than the adjacent foam. The joint seal may have an elastomer, such as silicone, at its top and/or bottom, and may even include an elastomer layer within or about the barrier.

37 Claims, 4 Drawing Sheets

Related U.S. Application Data

(60) Provisional application No. 61/946,311, filed on Feb. 28, 2014.

(51) Int. Cl.
*B32B 7/12* (2006.01)
*B32B 15/04* (2006.01)
*F16J 15/06* (2006.01)
*F16J 15/10* (2006.01)

(52) U.S. Cl.
CPC .......... *B32B 15/046* (2013.01); *F16J 15/065* (2013.01); *F16J 15/108* (2013.01); *B32B 2266/0278* (2013.01); *B32B 2266/08* (2013.01); *B32B 2307/202* (2013.01); *B32B 2307/302* (2013.01); *B32B 2307/304* (2013.01); *B32B 2307/3065* (2013.01); *B32B 2307/51* (2013.01); *B32B 2307/54* (2013.01); *B32B 2307/728* (2013.01); *B32B 2307/7246* (2013.01); *B32B 2307/7265* (2013.01); *B32B 2307/73* (2013.01); *B32B 2419/00* (2013.01); *B32B 2581/00* (2013.01)

(56) References Cited

U.S. PATENT DOCUMENTS

| | | | |
|---|---|---|---|
| 2,544,532 A | | 3/1951 | Hill |
| 2,995,056 A | | 10/1960 | Knox |
| 3,262,894 A | | 7/1966 | Green |
| 3,334,557 A | | 8/1967 | Fitzgibbon |
| 3,449,879 A | | 6/1969 | Bloom |
| 3,455,850 A | | 7/1969 | Saunders |
| 3,492,250 A | | 1/1970 | Deyrup |
| 3,527,009 A | | 9/1970 | Nyquist |
| 3,712,188 A | | 1/1973 | Worson |
| 3,772,220 A | | 11/1973 | Porter et al. |
| 3,827,204 A | | 8/1974 | Walters |
| 3,883,475 A | | 5/1975 | Racky et al. |
| 4,018,539 A | | 4/1977 | Puccio |
| 4,058,947 A | | 11/1977 | Earle et al. |
| 4,134,875 A | | 1/1979 | Tapia |
| 4,181,711 A | | 1/1980 | Ohashi et al. |
| 4,224,374 A | | 9/1980 | Priest |
| 4,237,182 A | | 12/1980 | Fulmer et al. |
| 4,260,688 A | | 4/1981 | Simon |
| 4,288,559 A | | 9/1981 | Illger |
| 4,374,207 A | | 2/1983 | Stone et al. |
| 4,401,716 A | | 8/1983 | Tschudin-Mahrer |
| 4,455,396 A | | 6/1984 | Al-Tabaqchall et al. |
| 4,565,550 A | | 1/1986 | Dorer, Jr. et al. |
| 4,566,242 A | | 1/1986 | Dunsworth |
| 4,654,550 A | | 3/1987 | Lowther et al. |
| 4,767,655 A | * | 8/1988 | Tschudin-Mahrer ..... E04B 1/68 206/83.5 |
| 4,839,223 A | | 6/1989 | Tschudin-Mahrer |
| 4,887,368 A | * | 12/1989 | Latzke .................. A43B 7/146 607/111 |
| 4,922,676 A | | 5/1990 | Sproken |
| 4,992,481 A | | 2/1991 | von Bonin et al. |
| 5,000,813 A | | 3/1991 | Hill |
| 5,006,564 A | | 4/1991 | Noonenbruch et al. |
| 5,007,765 A | | 4/1991 | Deitlein et al. |
| 5,130,176 A | | 7/1992 | Baerveldt |
| 5,173,515 A | | 12/1992 | von Bonin |
| 5,253,459 A | | 10/1993 | Parinas et al. |
| 5,327,693 A | | 7/1994 | Schmid |
| 5,335,466 A | | 8/1994 | Langohr |
| 5,686,174 A | | 7/1997 | Irrgeher |
| 5,694,730 A | * | 12/1997 | Del Rincon .......... E04B 1/6154 403/298 |
| 5,744,199 A | | 4/1998 | Joffre et al. |
| 5,765,332 A | | 6/1998 | Landin et al. |
| 5,935,695 A | | 8/1999 | Baerveldt |
| 6,039,503 A | | 3/2000 | Cathey |
| 6,418,688 B1 | | 7/2002 | Jones, Jr. |
| 6,532,708 B1 | * | 3/2003 | Baerveldt .............. E01D 19/06 404/47 |
| 6,544,445 B1 | | 4/2003 | Graf et al. |
| 6,666,618 B1 | | 12/2003 | Anaya et al. |
| 6,685,196 B1 | | 2/2004 | Baerveldt |
| 6,698,146 B2 | | 3/2004 | Morgan et al. |
| 6,928,777 B2 | | 8/2005 | Cordts |
| 8,317,444 B1 | | 11/2012 | Hensley |
| 8,341,908 B1 | | 1/2013 | Hensley et al. |
| 8,365,495 B1 | | 2/2013 | Witherspoon |
| 8,590,231 B2 | | 11/2013 | Pilz et al. |
| 8,595,999 B1 | | 12/2013 | Pilz et al. |
| 8,720,138 B2 | | 5/2014 | Hilburn, Jr. |
| 8,739,495 B1 | | 6/2014 | Witherspoon |
| 8,813,449 B1 | | 8/2014 | Hensley et al. |
| 8,813,450 B1 | * | 8/2014 | Hensley ................ E04B 1/6804 52/317 |
| 8,870,506 B2 | | 10/2014 | Hensley et al. |
| 8,935,897 B2 | | 1/2015 | Shaw |
| 9,045,899 B2 | | 6/2015 | Pilz et al. |
| 9,068,297 B2 | | 6/2015 | Hensley et al. |
| 9,200,437 B1 | | 12/2015 | Hensley et al. |
| 9,206,596 B1 | | 12/2015 | Robinson |
| 9,322,163 B1 | | 4/2016 | Hensley |
| 9,404,581 B1 | * | 8/2016 | Robinson ............... F16J 15/104 |
| 9,528,262 B2 | | 12/2016 | Witherspoon |
| 9,631,362 B2 | | 4/2017 | Hensley et al. |
| 9,637,915 B1 | | 5/2017 | Hensley et al. |
| 9,644,368 B1 | | 5/2017 | Witherspoon |
| 9,670,666 B1 | | 6/2017 | Witherspoon et al. |
| 9,677,299 B2 | | 6/2017 | Whiteley |
| 9,689,157 B1 | | 6/2017 | Hensley et al. |
| 9,689,158 B1 | | 6/2017 | Hensley et al. |
| 9,719,248 B1 | | 8/2017 | Meacham |
| 9,732,853 B2 | * | 8/2017 | Kethorn .................... E06B 1/64 |
| 9,739,049 B1 | | 8/2017 | Robinson |
| 9,739,050 B2 | | 8/2017 | Hensley et al. |
| 9,745,738 B2 | | 8/2017 | Robinson |
| 9,765,486 B1 | | 9/2017 | Robinson |
| 9,803,357 B1 | | 10/2017 | Robinson |
| 9,840,814 B2 | | 12/2017 | Robinson |
| 9,850,662 B2 | | 12/2017 | Hensley |
| 9,856,641 B2 | | 1/2018 | Robinson |
| 9,915,038 B2 | | 3/2018 | Robinson |
| 9,951,515 B2 | | 5/2018 | Robinson |
| 9,963,872 B2 | | 5/2018 | Hensley et al. |
| 9,982,428 B2 | | 5/2018 | Robinson |
| 9,982,429 B2 | | 5/2018 | Robinson |
| 2003/0005657 A1 | | 1/2003 | Visser et al. |
| 2003/0110723 A1 | | 6/2003 | Baerveldt |
| 2004/0035075 A1 | | 2/2004 | Trout |
| 2004/0093815 A1 | | 5/2004 | Cordts |
| 2005/0034389 A1 | | 2/2005 | Boot |
| 2005/0126848 A1 | | 6/2005 | Siavoshai |
| 2006/0053710 A1 | | 3/2006 | Miller et al. |
| 2006/0117692 A1 | | 6/2006 | Trout |
| 2007/0059516 A1 | | 3/2007 | Vincent et al. |
| 2008/0172967 A1 | * | 7/2008 | Hilburn .................. E04B 1/948 52/396.01 |
| 2008/0268231 A1 | | 10/2008 | Deib |
| 2010/0275539 A1 | | 11/2010 | Shaw |
| 2010/0304078 A1 | | 12/2010 | Stol |
| 2012/0022176 A1 | | 1/2012 | Strahl et al. |
| 2012/0023846 A1 | | 2/2012 | Mattox et al. |
| 2012/0117900 A1 | | 5/2012 | Shaw |
| 2013/0055667 A1 | | 3/2013 | Beele |
| 2014/0219719 A1 | | 8/2014 | Hensley et al. |
| 2014/0360118 A1 | | 12/2014 | Hensley et al. |
| 2015/0068139 A1 | | 3/2015 | Witherspoon |
| 2015/0337530 A1 | | 11/2015 | Pilz et al. |
| 2017/0130450 A1 | | 5/2017 | Witherspoon |
| 2017/0159817 A1 | | 6/2017 | Robinson |
| 2017/0191256 A1 | | 7/2017 | Robinson |
| 2017/0226733 A1 | | 8/2017 | Hensley et al. |
| 2017/0241132 A1 | | 8/2017 | Witherspoon |
| 2017/0254027 A1 | | 9/2017 | Robinson |
| 2017/0268222 A1 | | 9/2017 | Witherspoon et al. |

(56) References Cited

U.S. PATENT DOCUMENTS

| | | |
|---|---|---|
| 2017/0292262 A1 | 10/2017 | Hensley et al. |
| 2017/0298618 A1 | 10/2017 | Hensley et al. |
| 2017/0314213 A1 | 11/2017 | Robinson |
| 2017/0314258 A1 | 11/2017 | Robinson |
| 2017/0342665 A1 | 11/2017 | Robinson |
| 2017/0342708 A1 | 11/2017 | Hensley et al. |
| 2017/0370094 A1 | 12/2017 | Robinson |
| 2018/0002868 A1 | 1/2018 | Robinson |
| 2018/0016784 A1 | 1/2018 | Hensley et al. |
| 2018/0038095 A1 | 2/2018 | Robinson |
| 2018/0106001 A1 | 4/2018 | Robinson |
| 2018/0106032 A1 | 4/2018 | Robinson |
| 2018/0119366 A1 | 5/2018 | Robinson |
| 2018/0142465 A1 | 5/2018 | Robinson |
| 2018/0148922 A1 | 5/2018 | Robinson |

FOREIGN PATENT DOCUMENTS

| | | |
|---|---|---|
| CA | 2296779 | 11/2006 |
| DE | 4426280 A1 | 2/1996 |
| DE | 102005054375 A1 | 5/2007 |
| EP | 3942107 A2 | 9/1999 |
| EP | 1118715 B1 | 10/2004 |
| EP | 1540220 | 3/2006 |
| EP | 1983119 A1 | 4/2007 |
| GB | 977929 | 12/1964 |
| GB | 1359734 | 7/1974 |
| GB | 1495721 | 12/1977 |
| GB | 1519795 | 8/1978 |
| GB | 2251623 A1 | 7/1992 |
| GB | 2359265 A1 | 8/2001 |
| WO | 03006109 | 1/2003 |
| WO | 2003066766 A1 | 8/2003 |
| WO | 2007023118 A2 | 3/2007 |
| WO | 2006127533 A1 | 11/2009 |

OTHER PUBLICATIONS

Wikipedia, Bronze, retrieved on Aug. 30, 2018 from https://en.wikipedia.org/wiki/Bronze(Year: 2018).*

XHBN Joint Systems Data Sheet (retrieved Sep. 6, 2017 from http://database.ul.com/cgi-bin/XYV/template/LISEXT/1FRAME/showpage.html?name=XHBN.WW-D-0109&ccnshorttitle=Joint+Systems&objid=1082471571&cfgid=1073741824&version=versionless&parent_id=1073995560&sequence=1).

"Protecting the Foundation of Fire-safety" by Robert Berhinig, P.E. (IAEI News, Jul./Aug. 2002).

Iso Chemie GmbH; Iso-Flame Kombi F120; Jul. 1, 2006; 2 pages.

IsoChemie; Technical Datasheet blocostop F-120; Jul. 26, 2002; 1 page.

Lester Hensley; Where's the Beef in Joint Sealants? Hybrids Hold the Key; Spring 2001; Applicator vol. 23 No. 2; 5 pages (alternative version available at http://www.emseal.com/InTheNews/2001HybridsConstructionCanada.pdf).

MM Systems; ejp Expansion Joints EIF; Nov. 16, 2007; 2 pages.

MM Systems; ejp Expansion Joints; Nov. 16, 2007; 2 pages.

MM Systems; MM ColorJoint/SIF Series; 3 pages; Jan. 14, 2007.

Norton Performance Plastics Corporation; Norseal V740FR; 1996; 2 pages.

PCT/US2005/036849 filed Oct. 4, 2005 by Emseal Corporation; 11 pages; published Mar. 1, 2007 by World Intellectual Property Organization as WO 2007/024246.

Promat; Promaseal FyreStrip Seals for Movement in Joints in Floors/Walls; Feb. 2006; 4 pages.

Promat; Promaseal Guide for linear gap seals and fire stopping systems; 20 pages; Jun. 2008.

Promat; Promaseal IBS Foam Strip Penetration Seals on Floors/Walls; Sep. 2004; 6 pages.

Promat; Promaseal IBS Safety Data Sheet; Jul. 25, 2007; 3 pages.

Salamander Industrial Products Inc.; Blocoband HF; Feb. 15, 1996; 1 page.

Schul International Co. LLC; Color Econoseal Technical Data; Nov. 18, 2005; 2 pages.

Schul International Co. LLC; Sealtite "B" Technical Data; Oct. 28, 2005; 2 pages.

Schul International Co. LLC; Sealtite Airstop AR; Apr. 2004; 1 page.

Schul International Co. LLC; Sealtite Airstop AR; Apr. 2007; 1 page.

Schul International Co. LLC; Sealtite Standard; May 9, 2007; 2 pages.

Schul International Co. LLC; Sealtite Technical Data; Oct. 28, 2005; 2 pages.

Schul International Co. LLC; Sealtite VP (600) Technical Data; 2002.

Schul International Co. LLC; Seismic Sealtite II Technical Data; Sep. 20, 2006; 2 pages.

Schul International Co. LLC; Seismic Sealtite Technical Data; Oct. 28, 2005; 2 pages.

Lee W. Young, Written Opinion of the International Searching Authority, PCT/US06/60096, dated Oct. 23, 2007, 4 pages, USPTO, USA.

Schul International Inc.; Sealtite 50N Technical Data; 2002; 2 pages.

Schul International Inc.; Sealtite 50N Technical Data; Oct. 28, 2005; 2 pages.

Emseal's new Universal-90 expansion joints, Buildingtalk, Mar. 27, 2009, 2 pages, Pro-Talk Ltd.

Schul International Inc.; Sealtite VP; Oct. 28, 2005; 2 pages.

Schul International Inc.; Sealtite; Jul. 25, 2008; 3 pages.

Sealant Waterproofing & Restoration Institute; Sealants: The Professionals' Guide p. 26; 1995; 3 pages.

Stein et al. "Chlorinated Paraffins as Effective Low Cost Flame Retardants for Polyethylene" Dover Chemical Company 9 pages.

Tremco illbruck B.V.; Cocoband 6069; Apr. 2007; 2 pages.

Tremco illbruck Limited; Alfacryl FR Intumescent Acrylic; Oct. 22, 2007; 2 pages.

Tremco illbruck Limited; Alfasil FR Oct. 22, 2007; 2 pages.

Tremco illbruck Limited; Compriband 600; Oct. 5, 2007; 2 pages.

Tremco illbruck Limited; Compriband Super FR; Dec. 4, 2007; 2 pages.

Tremco illbruck Limited; Technical Data Sheet Product Compriband Super FR; Oct. 18, 2004; 4 pages.

Tremco Illbruck Limited; Technical Data Sheet Product: Compriband Super; Sep. 29, 2004; 3 pages.

Tremco illbruck Limited; TechSpec Division Facade & Roofing Solutions; Mar. 2005; 10 pages.

Tremco illbruck; Alfas Bond; Apr. 13, 2007; 2 pages.

Tremco Illbruck; illmod 600; Jun. 2006; 2 pages.

Tremco illbruck; The Specification Product Range; Feb. 2007; 36 pages.

Tremco-illbruck Ltd.; Webbflex B1 PU Foam; Nov. 9, 2006; 2 pages.

Thomas Dunn, International Preliminary Report on Patentability— PCT/US06/60096, dated Oct. 21, 2008, 6 pages, USPTO, USA.

Underwriter Laboratories Inc.; UL 2079 Tests for Fire Resistance of Building Joint Systems; Jun. 30, 2008; 38 pages.

Underwriter Laboratories LLC; System No. WW-S-0007 Joint Systems; Dec. 5, 1997 pages.

Underwriters Laboratories; Fire-resistance ratings ANSI/UL 263; 2014; 24 pages.

Underwriters Laboratories; UL 263 Fire Tests of Building Construction and Materials; Apr. 4, 2003; 40 pages.

Lee W. Young, International Search Report, PCT/US06/60096, dated Oct. 23, 2007, 2 pages, USPTO, USA.

BEJS System, Mar. 2009, 2 pages, Emseal Joint Systems, Ltd., USA.

Harry Kim; International Preliminary Report on Patentability for PCT Application No. PCT/US17/17132; dated Feb 6, 2018; 6 pages; USPTO as IPEA; Alexandria, Virginia.

Adolf Wurth GmbH & Co. KG; 81 Elastic Joint Sealing Tape; retrieved Aug. 5, 2005; 4 pages.

Amber Composites; Expanding PU Foam Technical Data Sheet (Premier BG1); Feb. 1997; 2 pages.

(56) References Cited

OTHER PUBLICATIONS

ASTM International; ASTM E84-04; 2004; 19 pages.
ASTM International; Designation E 176-07 Standard Terminology of Fire Standards; 2007; 20 pages.
ASTM International; Standard Terminology of Fire Standards; Nov. 11, 2014; 20 pages.
Auburn Manufacturing Company; Auburn Product News—R-10400M; Dec. 2007; 1 page.
AWCI Construction Dimensions; Where's the Beef in Joint Sealants? Hybrids Hold the Key by Lester Hensley; Jan. 2006 3 pages.
British Board of Agrement; Compriband 600 Sealing Tapes—Certificate 96/3309; Jul. 14, 2005; 8 page.
British Board of Agrement; Compriband Super—Certificate 97/3331; Aug. 2, 2005; 4 pages.
British Board of Agrement; Illmod 600 Sealing Tapes; Mar. 26, 2003; 8 pages.
British Standards Institute; Translation—NEN 6069; Oct. 1991; 31 pages.
British Standards Institution; Fire tests on building materials and structures (BS476:Part 20); 1987; 44 pages.
Building and Engineering Standards Committee; Impregnated cellular plastics strips for sealing external joints—DIN 18542; Jan. 1999; 10 pages.
BuildingTalk; Choosing a sealant for building applications by Lester Hensley CEO and President of Emseal; May 21, 2007; 6 pages.
Centre for Fire Research; Determination of the Fire Resistance According to NEN 6069 of Joints in a Wall Sealed with Cocoband 6069 Impregnated Foam Strip; Nov. 1996; 19 pages.
DIN ev; Fire behavior of building materials and building components; Sep. 1977; 11 pages.
DIN ev; Fire behavior of building materials and building components; May 1998; 33 pages.
DIN ev; Fire behavior of building materials and elements; Mar. 1994; 144 pages.
Dow Corning; Dow Corning 790 Silicone Building Sealant; 1999; 8 pages.
Dow Corning; Dow Corning 790 Silicone Building Sealant; 2000; 6 pages.
Dow Corning; Dow Corning 790 Silicone Building Sealant; 2004; 4 pages.
Dow Corning; Dow Corning Firestop 400 Silicone Sealant; Jan. 15, 2001; 4 pages.
Dow Corning; Dow Corning Firestop 700 Silicone Sealant; Jan. 15, 2001; 6 pages.
Emseal Joint Systems Ltd.; Horizontal Colorseal Aug. 2000 2 pages.
Emseal Joint Systems Ltd.; Colorseal PC/SA Stick; 1 page; Jun. 7, 1995.
Emseal Joint Systems Ltd.; SJS-100-CHT-RN; 1 page; Nov. 20, 2007.
Emseal Joint Systems Ltd; 20H System Tech Data; Jun. 1997; 2 pages.
Emseal Joint Systems Ltd; Colorseal Aug. 2000 2 pages.
Emseal Joint Systems Ltd; DSH System; Nov. 2005; 2 pages.
Emseal Joint Systems Ltd; Fire-Rating of Emseal 20H System; Author of "LH"; Feb. 17, 1993/Apr. 18, 1993; 2 pages.
Emseal Joint Systems Ltd; Horizontal Colorseal Tech Data; Jun. 1997; 2 pages.
Emseal Joint Systems Ltd; Preformed Sealants and Expansion Joint Systems; May 2002, 4 pages.
Emseal Joint Systems Ltd; Preformed Sealants and Expansion Joints.; Jan. 2002; 4 pages.
Emseal Joint Systems Ltd; Seismic Colorseal; Apr. 1998; 2 pages.
Emseal Joint Systems; Seismic Colorseal; Aug. 2000; 2 pages.
Emseal; Benchmarks of Performance for High Movement Acrylic-Impregnated Precompressed Foam Sealants; Aug. 21, 2007; 7 pages.
Emseal; Seismic Colorseal-DS (Double Sided); Apr. 12, 2007; 4 pages.
Envirograf; Fire Kills; 2004; 8 pages available by at least Nov. 10, 2006 per Archive.org.
Fire Retardants Inc.; Fire Barrier CP 25WB + Caulk; 2002; 4 pages.
IBMB; Test 3002/2719—Blocostop F120; Mar. 24, 2000; 14 pages.
IBMB; Test 3263/5362—Firestop N; Jul. 18, 2002; 13 pages.
IBMB; Test 3568/2560; Sep. 30, 2005; 14 pages.
IFT Rosenheim; Evidence of Performance—Test Report 105 3246911e U R1; Apr. 19, 2006; 8 pages.
Illbruck Bau-Produkte GmbH u Co. KG; Willseal Firestop; Sep. 30, 1995; 2 pages.
Illbruck Inc.; Will-Seal 250 Spec Data; Aug. 1989; 2 pages.
Illbruck International; willseal the joint sealing tape; Jan. 1991; 19 pages.
Illbruck Sealant Systems inc..; Illbruck Willseal 600; Sep. 2001; 2 pages.
Illbruck USA; MSDS—Willseal 150/250 and/or EPS; Jul. 21, 1986; 2 pages.
Illbruck/USA; Will-Seal 150 Spec Data; Nov. 1987; 2 pages.
Iso Chemie GmbH; Iso-Bloco 600; 2 pages; Jul. 1, 2006.
Hai Vo; Final Office Action for U.S. Appl. No. 14/630,125; dated May 13, 2016; 11 pages; USPTO; Alexandria, Virginia.
Hai Vo; Non-Final Office Action for U.S. Appl. No. 14/630,125; dated Feb. 8, 2016; 8 pages; USPTO; Alexandria, Virginia.
Hai Vo; Notice of Allowance for U.S. Appl. No. 14/630,125; dated Jun. 14, 2016; 12 pages; USPTO; Alexandria, Virginia.
Beth A. Stephan; Notice of Allowance for U.S. Appl. No. U.S. Appl. No. 14/643,031; dated Oct. 28, 2015; 8 pages; USPTO; Alexandria, Virginia.
Paola Agudelo; Final Office Action for U.S. Appl. No. 15/046,924; dated May 10, 2017; 13 pages; USPTO; Alexandria, Virginia.
Paola Agudelo; Non-Final Office Action for U.S. Appl. No. 15/046,924; Dec. 12, 2016; 12 pages; USPTO; Alexandria, Virginia.
Paola Agudelo; Notice of Allowance for U.S. Appl. No. 15/046,924; dated Jul. 6, 2017; 7 pages; USPTO; Alexandria, Virginia.
Gilbert Y. Lee; Notice of Allowance for U.S. Appl. No. 15/217,085; dated Sep. 13, 2017; 8 pages; USPTO Alexandria, Virginia.
Paola Agudelo; Non-Final Office Action for U.S. Appl. No. 15/648,908; dated Oct. 4, 2017; 11 pages.; USPTO; Alexandria, Virginia.
Paola Agudelo; Notice of Allowance for U.S. Appl. No. 15/648,908; dated Oct. 27, 2017; 8 pages; USPTO; Alexandria, Virginia.
Gilbert Y. Lee; Notice of Allowance for U.S. Appl. No. 15/649,927; dated Nov. 8, 2017; 7 pages; USPTO; Alexandria, Virginia.
Gilbert Y. Lee; Notice of Allowance for U.S. Appl. No. 15/677,811; dated Nov. 28, 2017; 7 pages; USPTO; Alexandria, Virginia.
Beth A. Stephan; Non-Final Office Action for U.S. Appl. No. 15/681,500; dated Jan. 5, 2018; 10 pages; USPTO; Alexandria, Virginia.
John Nguyen; International Preliminary Report on Patentability for PCT Application No. PCT/US16/19059; dated May 30, 2017; 6 pages; USPTO as IPEA; Alexandria, Virginia.
Shane Thomas; International Search Report and Written Opinion for PCT Application No. PCT/US16/19059; dated May 20, 2016; 7 pages; USPTO as ISA; Alexandria, Virginia.
Harry C. Kim; International Preliminary Report on Patentability for PCT Application No. PCT/US16/66495; dated Jan. 18, 2018; 8 pages; USPTO as IPEA; Alexandria, Virginia.
Shane Thomas; International Search Report and Written Opinion for PCT Application No. PCT/US16/66495; dated Feb. 27, 2017; 7 pages; USPTO as ISA; Alexandria, Virginia.
Shane Thomas; International Search Report and Written Opinion for PCT Application No. PCT/US17/17132; dated May 4, 2017; 6 pages; USPTO as ISA; Alexandria, Virginia.
20H System Tech Data, Jun. 1997, 2 pages, Emseal Joint Systems, Ltd., USA.
Horizontal Colorseal Tech Data, Jun. 1997, 2 pages, Emseal Joint Systems, Ltd.
Emseal Acrylic Log Home Tape Installation Instructions, Jun. 2011, 1 page, Emseal Joint Systems, Ltd., retrieved on Mar. 30, 2016 from https://web.archive.org/web/20160330181621/http://www.emseal.com/Products- /Specialty/LogHome/AcrylicLogHome.sub.-Tapes.sub.--Install.sub.--X.pdf.
Emseal BEJS System—Bridge Expansion Joint System, May 26, 2010, 5 pages, Emseal Joint Systems, Ltd., retrieved on Mar. 30,

(56) References Cited

OTHER PUBLICATIONS 2016 from https://web.archive.org/web/20100526081854/http://www.emseal.com/products-/Infrastructure/BridgeJointSeals/BEJSBridgeJointSystem.htm.
Dow Corning 890-SL Self-Leveling Silicone Joint Sealant, 2005, 4 pages, USA.
Install Data—Horizontal Colorseal—with Epoxy Adhesive, Jun. 1997, 2 pages, Emseal Joint Systems, Ltd., USA.
Backerseal (Greyflex), Sep. 2001, 2 pages, Emseal Joint Systems, Ltd., USA.
Emseal Emshield DFR2 System DFR3 System Tech Data, May 2010, 4 pages, Emseal Joint Systems, Ltd., USA.
Seismic Colorseal by Emseal, Aug. 21, 2007, 4 pages, Emseal Corporation, USA
Universal 90's, Aug. 4, 2009, 4 pages, Emseal Joint Systems, Ltd., USA.
Specified Technologies, Inc.; Product Data Sheet PEN200 Silicone Foam; 2003; 2 pages.
Specified Technologies, Inc.; Product Data Sheet SpecSeal Series ES Elastomeric Sealant; 2004; 4 pages.
Specified Technologies, Inc.; Product Data Sheet SpecSeal Series ES Elastomeric Sealant; 2000; 4 pages.
Specified Technologies, Inc.; Product Data Sheet PEN300 Silicone Foam; 2004; 4 pages.
Specified Technologies, Inc.; Firestop Submittal Package; 2000; 37 pages.
UL, LLC; Online Certifications Directory; "System No. WW-D-1092, XHBN.WW-D-1092 Joint Systems"; Sep. 24, 2012; retrieved on Feb. 1, 2018 from http://database.ul.com/cgi-bin/XYV/template/LISEXT/1FRAME/showpage.html?name=XHBN.WW-D-1092&ccnshorttitle=Joint+Systems&objid=1082471646&cfgid=1073741824&version=versionless&parent_id=1073995560&sequence=1; 2 pages.
UL, LLC; Online Certifications Directory; "System No. WW-D-1093, XHBN.WW-D-1093 Joint Systems"; Oct. 6, 2014; retrieved on Feb. 1, 2018 from http://database.ul.com/cgi-bin/XYV/template/LISEXT/1FRAME/showpage.html?name=XHBN.WW-D-1093&ccnshorttitle=Joint+Systems&objid=1082823956&cfgid=1073741824&version=versionless&parent_id=1073995560&sequence=1; 3 pages.
UL, LLC; Online Certifications Directory; "System No. HW-D-1098, XHBN.HW-D-1098 Joint Systems"; Jun. 6, 2013; retrieved on Feb. 1, 2018 from http://database.ul.com/cgi-bin/XYV/template/LISEXT/1FRAME/showpage.html?name=XHBN.HW-D-1098&ccnshorttitle=Joint+Systems&objid=1082700131&cfgid=1073741824&version=versionless&parent_id=1073995560&sequence=1; 3 pages.
UL, LLC; Online Certifications Directory; "System No. FF-D-1100, XHBN.FF-D-1100 Joint Systems"; Sep. 24, 2012; retrieved on Feb. 1, 2018 from http://database.ul.com/cgi-bin/XYV/template/LISEXT/1FRAME/showpage.html?name=XHBN.FF-D-1100&ccnshorttitle=Joint+Systems&objid=1082567162&cfgid=1073741824&version=versionless&parent_id=1073995560&sequence=1; 2 pages.
UL, LLC; Online Certifications Directory; "System No. WW-D-1101, XHBN.WW-D-1101 Joint Systems"; Oct. 6, 2014; retrieved on Feb. 1, 2018 from http://database.ul.com/cgi-bin/XYV/template/LISEXT/1FRAME/showpage.html?name=XHBN.WW-D-1101&ccnshorttitle=Joint+Systems&objid=1082823966&cfgid=1073741824&version=versionless&parent_id=1073995560&sequence=1; 2 pages.
UL, LLC; Online Certifications Directory; "System No. WW-D-1102, XHBN.WW-D-1102 Joint Systems"; Sep. 24, 2012; retrieved on Feb. 1, 2018 from http://database.ul.com/cgi-bin/XYV/template/LISEXT/1FRAME/showpage.html?name=XHBN.WW-D-1092&ccnshorttitle=Joint+Systems&objid=108699876&cfgid=1073741824&version=versionless&parent_id=1073995560&sequence=1; 2 pages.
UL, LLC; Online Certifications Directory; "System No. FF-D-1109, XHBN.FF-D-1109 Joint Systems"; Jul. 29, 2013; retrieved on Feb. 1, 2018 from http://database.ul.com/cgi-bin/XYV/template/LISEXT/1FRAME/showpage.html?name=XHBN.FF-D-1109&ccnshorttitle=Joint+Systems&objid=1082845106&cfgid=1073741824&version=versionless&parent_id=1073995560&sequence=1; 2 pages.
UL, LLC; Online Certifications Directory; "System No. FF-D-1110, XHBN.FF-D-1110 Joint Systems"; Nov. 1, 2013; retrieved on Feb. 1, 2018 from http://database.ul.com/cgi-bin/XYV/template/LISEXT/1FRAME/showpage.html?name=XHBN.ff-D-1110&ccnshorttitle=Joint+Systems&objid=1082845102&cfgid=1073741824&version=versionless&parent_id=1073995560&sequence=1; 2 pages.
UL, LLC; Online Certifications Directory; "System No. WW-D-1119, XHBN.WW-D-1119 Joint Systems"; Jul. 29. 24, 2013; retrieved on Feb. 1, 2018 from http://database.ul.com/cgi-bin/XYV/template/LISEXT/1FRAME/showpage.html?name=XHBN.WW-D-1119&ccnshorttitle=Joint+Systems&objid=1083149741&cfgid=1073741824&version=versionless&parent_id=1073995560&sequence=1; 3 pages.
UL, LLC; Online Certifications Directory; "System No. WW-D-1120, XHBN.WW-D-1120 Joint Systems"; Jun. 6, 2013; retrieved on Feb. 1, 2018 from http://database.ul.com/cgi-bin/XYV/template/LISEXT/1FRAME/showpage.html?name=XHBN.WW-D-1120&ccnshorttitle=Joint+Systems&objid=1083149707&cfgid=1073741824&version=versionless&parent_id=1073995560&sequence=1; 2 pages.
UL, LLC; Online Certifications Directory; "System No. FF-D-1148, XHBN.FF-D-1148 Joint Systems"; May 15, 2014; retrieved on Feb. 1, 2018 from http://database.ul.com/cgi-bin/XYV/template/LISEXT/1FRAME/showpage.html?name=XHBN.FF-D-1148&ccnshorttitle=Joint+Systems&objid=1084034211&cfgid=1073741824&version=versionless&parent_id=1073995560&sequence=1; 2 pages.
UL, LLC; Online Certifications Directory; "System No. WW-D-1152, XHBN.WW-D-1152 Joint Systems"; Aug. 14, 2014; retrieved on Feb. 1, 2018 from http://database.ul.com/cgi-bin/XYV/template/LISEXT/1FRAME/showpage.html?name=XHBN.WW-D-1152&ccnshorttitle=Joint+Systems&objid=1084034221&cfgid=1073741824&version=versionless&parent_id=1073995560&sequence=1; 2 pages.
UL, LLC; Online Certifications Directory; "System No. WW-D-1153, XHBN.WW-D-1153 Joint Systems"; Aug. 20, 2014; retrieved on Feb. 1, 2018 from http://database.ul.com/cgi-bin/XYV/template/LISEXT/1FRAME/showpage.html?name=XHBN.WW-D-1153&ccnshorttitle=Joint+Systems&objid=1084052791&cfgid=1073741824&version=versionless&parent_id=1073995560&sequence=1; 2 pages.
UL, LLC; Online Certifications Directory; "System No. WW-D-1154, XHBN.WW-D-1154 Joint Systems"; Jun. 16, 2014; retrieved on Feb. 1, 2018 from http://database.ul.com/cgi-bin/XYV/template/LISEXT/1FRAME/showpage.html?name=XHBN.WW-D-1154&ccnshorttitle=Joint+Systems&objid=1084052801&cfgid=1073741824&version=versionless&parent_id=1073995560&sequence=1; 2 pages.
UL, LLC; Online Certifications Directory; "System No. FF-D-1156, XHBN.FF-D-1156 Joint Systems"; Nov. 9, 2015; retrieved on Feb. 1, 2018 from http://database.ul.com/cgi-bin/XYV/template/LISEXT/1FRAME/showpage.html?name=XHBN.FF-D-1156&ccnshorttitle=Joint+Systems&objid=1085235671&cfgid=1073741824&version=versionless&parent_id=1073995560&sequence=1; 2 pages.
UL, LLC; Online Certifications Directory; "System No. FF-D-1157, XHBN.FF-D-1157 Joint Systems"; Nov. 9, 2015; retrieved on Feb. 1, 2018 from http://database.ul.com/cgi-bin/XYV/template/LISEXT/1FRAME/showpage.html?name=XHBN.FF-D-1157&ccnshorttitle=Joint+Systems&objid=1085235726&cfgid=1073741824&version=versionless&parent_id=1073995560&sequence=1; 2 pages.
Schul International; Firejoint 2FR-H & Firejoint 3FR-H; 2012; 2 pages.
Schul International; Firejoint 2FR-V & Firejoint 3FR-V; 2012; 2 pages.
UL, LLC; Online Certifications Directory; "System No. HW-D-1101, XHBN.HW-D-1101 Joint Systems"; Sep. 11, 2013; retrieved on Feb. 1, 2018 from http://database.ul.com/cgi-bin/XYV/template/LISEXT/1FRAME/showpage.html?name=XHBN.HW-D-1101&ccnshorttitle=Joint+Systems&objid=1083156306&cfgid=1073741824&version=versionless&parent_id=1073995560&sequence=1; 3 pages.
UL, LLC; Online Certifications Directory; "System No. FF-D-1121, XHBN.FF-D-1121 Joint Systems"; Apr. 25, 2013; retrieved on Feb. 1, 2018 from http://database.ul.com/cgi-bin/XYV/template/LISEXT/1FRAME/showpage.html?name=XHBN.FF-D-1121&ccnshorttitle=Joint+Systems&objid=1083156406&cfgid=1073741824&version=versionless&parent_id=1073995560&sequence=1; 2 pages.
UL, LLC; Online Certifications Directory; "System No. FF-D-1122, XHBN.FF-D-1122 Joint Systems"; Sep. 11, 2013; retrieved on Feb. 1, 2018 from http://database.ul.com/cgi-bin/XYV/template/LISEXT/1FRAME/showpage.html?name=XHBN.FF-D-1122&ccnshorttitle=

(56) References Cited

OTHER PUBLICATIONS

Joint+Systems&objid=1083156361&cfgid=1073741824&version=versionless&parent_id=1073995560&sequence=1; 2 pages.
UL, LLC; Online Certifications Directory; "System No. FF-D-1123, XHBN.FF-D-1123 Joint Systems"; Sep. 24, 2012; retrieved on Feb. 1, 2018 from http://database.ul.com/cgi-bin/XYV/template/LISEXT/1FRAME/showpage.html?name=XHBN.FF-D-1123&ccnshorttitle=Joint+Systems&objid=1083156331&cfgid=1073741824&version=versionless&parent_id=1073995560&sequence=1; 2 pages.
UL, LLC; Online Certifications Directory; "System No. WW-D-1124, XHBN.WW-D-1124 Joint Systems"; Sep. 11, 2013; retrieved on Feb. 1, 2018 from http://database.ul.com/cgi-bin/XYV/template/LISEXT/1FRAME/showpage.html?name=XHBN.WW-D-1124&ccnshorttitle=Joint+Systems&objid=1083156186&cfgid=1073741824&version=versionless&parent_id=1073995560&sequence=1; 2 pages.
UL, LLC; Online Certifications Directory; "System No. WW-D-1125, XHBN.WW-D-1125 Joint Systems"; Apr. 25, 2013; retrieved on Feb. 1, 2018 from http://database.ul.com/cgi-bin/XYV/template/LISEXT/1FRAME/showpage.html?name=XHBN.WW-D-1125&ccnshorttitle=Joint+Systems&objid=1083156176&cfgid=1073741824&version=versionless&parent_id=1073995560&sequence=1; 2 pages.
UL, LLC; Online Certifications Directory; "System No. WW-D-1126, XHBN.WW-D-1126 Joint Systems"; Sep. 11, 2013; retrieved on Feb. 1, 2018 from http://database.ul.com/cgi-bin/XYV/template/LISEXT/1FRAME/showpage.html?name=XHBN.WW-D-1126&ccnshorttitle=Joint+Systems&objid=1083156461&cfgid=1073741824&version=versionless&parent_id=1073995560&sequence=1; 2 pages.
UL, LLC; Online Certifications Directory; "System No. WW-D-1127, XHBN.WW-D-1127 Joint Systems"; Sep. 11, 2013; retrieved on Feb. 1, 2018 from http://database.ul.com/cgi-bin/XYV/template/LISEXT/1FRAME/showpage.html?name=XHBN.WW-D-1127&ccnshorttitle=Joint+Systems&objid=1083156441&cfgid=1073741824&version=versionless&parent_id=1073995560&sequence=1; 3 pages.
UL, LLC; Online Certifications Directory; "System No. FF-D-1151, XHBN.FF-D-1151 Joint Systems"; Aug. 20, 2014; retrieved on Feb. 1, 2018 from http://database.ul.com/cgi-bin/XYV/template/LISEXT/1FRAME/showpage.html?name=XHBN.FF-D-1151&ccnshorttitle=Joint+Systems&objid=1084241891&cfgid=1073741824&version=versionless&parent_id=1073995560&sequence=1; 2 pages.
UL, LLC; Online Certifications Directory; "System No. WW-D-1160, XHBN.WW-D-1160 Joint Systems"; Aug. 20, 2014; retrieved on Feb. 1, 2018 from http://database.ul.com/cgi-bin/XYV/template/LISEXT/1FRAME/showpage.html?name=XHBN.WW-D-1160&ccnshorttitle=Joint+Systems&objid=1084241902&cfgid=1073741824&version=versionless&parent_id=1073995560&sequence=1; 2 pages.
UL, LLC; Online Certifications Directory; "System No. WW-D-1161, XHBN.WW-D-1161 Joint Systems"; Aug. 20, 2014; retrieved on Feb. 1, 2018 from http://database.ul.com/cgi-bin/XYV/template/LISEXT/1FRAME/showpage.html?name=XHBN.WW-D-1161&ccnshorttitle=Joint+Systems&objid=1084241911&cfgid=1073741824&version=versionless&parent_id=1073995560&sequence=1; 3 pages.
UL, LLC; Online Certifications Directory; "System No. WW-D-1162, XHBN.WW-D-1162 Joint Systems"; Aug. 20, 2014; retrieved on Feb. 1, 2018 from http://database.ul.com/cgi-bin/XYV/template/LISEXT/1FRAME/showpage.html?name=XHBN.WW-D-1161&ccnshorttitle=Joint+Systems&objid=1084241921&cfgid=1073741824&version=versionless&parent_id=1073995560&sequence=1; 2 pages.
UL, LLC; Online Certifications Directory; "System No. FF-D-1174, XHBN.FF-D-1174 Joint Systems"; Jul. 11, 2016; retrieved on Feb. 1, 2018 from http://database.ul.com/cgi-bin/XYV/template/LISEXT/1FRAME/showpage.html?name=XHBN.FF-D-1174&ccnshorttitle=Joint+Systems&objid=1085930212&cfgid=1073741824&version=versionless&parent_id=1073995560&sequence=1; 2 pages.
UL, LLC; Online Certifications Directory; "System No. FF-D-1175, XHBN.FF-D-1175 Joint Systems"; Jul. 12, 2016; retrieved on Feb. 1, 2018 from http://database.ul.com/cgi-bin/XYV/template/LISEXT/1FRAME/showpage.html?name=XHBN.FF-D-1175&ccnshorttitle=Joint+Systems&objid=1085930226&cfgid=1073741824&version=versionless&parent_id=1073995560&sequence=1; 2 pages.
Nillseal, LLC; Willseal FR-2V; Mar. 4, 2013; 6 pages.
Willseal, LLC; Willseal FR-2H; Mar. 4, 2013; 6 pages.
Willseal, LLC; Willseal FR-V; dated 2013; 6 pages.
Willseal, LLC; Willseal FR-H; dated 2013; 6 pages.
Schul International Company, LLC; Firejoint 2FR-H & Firejoint 2FR-V; Aug. 2014; 3 pages.
Willseal, LLC; Willseal FR-2H & Willseal FR-2V; Mar. 4, 2013; 3 pages.
Willseal LLC; Willseal FR-H / Willseal FR-V; Oct. 2016; retrieved on Feb. 2, 2018 from https://willseal.com/wp-content/uploads/2016/10/WillsealFR_Install.pdf; 3 pages.
Schul International Company, LLC; Sealtite 50N; May 9, 2007; 2 pages.
Schul International Company, LLC; Seismic Sealtite; May 9, 2007; 2 pages.
Willseal LLC; MSDS for Willseal FR-V & FR-H; Jul. 19, 2013; 11 pages.
Schul International Company, LLC; Firejoint 2FR-V +50; dated 2012; 2 pages.
Stein et al. "Chlorinated Paraffins as Effective Low Cost Flame Retardants for Polyethylene" Dover Chemical Company Feb. 2003, 9 pages.
Hilti, Inc.; Firestop Board (CP 675T); 1 page; Apr. 2, 2007 (date shown in Google search: https://www.google.com/search?q=hilti+cp+675&source=Int&tbs=cdr%3A1%2Ccd_min%3A1%2F1%2F1900%2Ccd_max%3A12%2F31%2F2009&tbm).
Sandell Manufacturing Company, Inc.; Polyseal Precompressed Joint Sealant; 2 pages; Available by Jan. 31, 2000.
Advanced Urethane Technologies; Polyurethane Foam Specification Sheet; 1 page; Apr. 1, 2007.
American Institute of Architects, Masterspec, Feb. 1997.
Bonsignore, P.V.; Alumina Trihydrate as a Flame Retardant for Polyurethane Foams; Journal of Cellular Plastics, 174(4): 220-225; Jul./Aug. 1981; 6 pages.
Bonsignore, P.V.; Flame Retardant Flexible Polyurethane Foam by Post-Treatment with Alumina Trihydrate/latex Binder Dispersion Systems;Journal of Cellular Plastics; May-Jun. 1979, pp. 163-179, 17 pages.
Dow Corning USA; Letter of Oct. 4, 1984 to Emseal USA, Inc.; 1 page; Oct. 4, 1984.
Emseal Corporation; Emseal Emseal GreyFlex SpecData; 1984; 4 pages.
Emseal Joint System, Ltd.; 25V; Apr. 1996; 2 pages.
Emseal Joint Systems, Ltd.; Colorseal Tech Data; 2 pages; Feb. 1991.
Emseal Joint System, Ltd.; Colorseal TechData; Jan. 2000.
Emseal Joint Systems, Ltd.; Colorseal in EIFS Application Focus; May 1997; 2 pages.
Emseal Joint Systems, Ltd.; Greyflex Expanding Foam Sealant; Feb. 1992.
Emseal Joint Systems, Ltd.; Greyflex Tech Data; Apr. 1996.
Emseal Joint Systems, Ltd.; The Complete Package for All Joint Requirements; 6 pages; 1988.
Emseal Corporation; Research and Development at Emseal; Jun. 27, 2007; 2 pages.
Envirograf; Product 40: Intumescent-Coated Fireproof Sponge (Patented); Apr. 8, 2007, 2 pages.
Hilti Construction Chemicals, Inc.; CP 604 Flexible Firestop Sealant; 1 page; 2005.
Hilti Construction Chemicals, Inc.; CP 606 Flexible Firestop Sealant; 5 pages; Apr. 25, 2000.
Hilti, Inc.; Firestop Board (CP 675T); undated; 1 page.
Hilti Firestop Systems; Untitled; 3 pages; Aug. 2013.
Hilti, Inc; FS 657 Product Information, Material Safety Data Sheet, and UL Certificate of Compliance; 4 pages; Feb. 14, 2006.
Hilti Inc.; Material Data Safety Sheet Fs 657 Fire Block; CP 658T Firestop Plug; 2 pages; Mar. 1, 2005.
Illbruck Construction Products; Worldwide solutions to joint-sealing and acoustic problems; Apr. 9, 1998; 77 pages.
Illbruck; Will-Seal Precompressed expanding foam sealants; Sep. 1988; 4 pages.
Illbruck Inc.; Willseal precompressed foam sealants; 1991; 4 pages.
Illbruck/USA; Will-Seal (binder); 39 pages; 1984.
Illbruck; Product Data Sheet Compriband MPA; Apr. 2000; 2 pages.

(56) References Cited

OTHER PUBLICATIONS

Illbruck Sealant Systems, inc.; Fax-Message of Jan. 30, 2002; Jan. 30, 2002; 14 pages.

Illbruck Sealant Systems, inc.; Fax-Message of Feb. 15, 2002; Feb. 15, 2002; 14 pages.

Iso-Chemie GmbH; Sicherheitsdatenblatt (ISO Flame Kombi F120); Jun. 30, 2004; 3 pages.

IsoChemie; Invoice 135652 to Schul International Co., LLC. for Iso-Bloco 600 and Iso-Flame Kombi F120; Apr. 26, 2007; 3 pages // IsoChemie; Order Confirmation 135652 to Schul International Co., LLC. for Iso-Bloco 600 and Iso-Flame Kombi F120; Apr. 26, 2007; 3 pages // IsoChemie; Correspondence of Jun. 8, 2006 and prior; 13 pages // Schul International Company; Invoice 18925 to P.J., Spillane; Sep. 14, 2007; 6 pages.

Katz, Harry S. and Milewski, John V.; Handbook of Fillers for Plastics; 1987; pp. 292-312.

Polytite Manufacturing Corp.; Spec Section 07920 Polytite Expansion Joint System; 1 page; May 1989.

Sandell Manufacturing Company, Inc.; About Polyseal-procompressed joint sealant—from Sandell Manufacturing; 2 pages; Mar. 15, 1999.

Sandell Manufacturing Company, Inc.; Polyseal Procompressed Joint Sealant; 2 pages; Undated.

Sandell Manufacturing Company, Inc.; Polytite Sealant & Construction Gasket; 1 page; 1978.

Schul International Co., LLC.; Seismic Sealtite "R"; 2 pages; 2002.

Soudal NV; Soudaband Acryl; Jun. 7, 2005; 4 pages.

Tremco Illbruck; Illbruck illmod Trio; Jun. 2007; 2 pages.

Tremco illbruck Produktion GmbH; Materials Safety Data Sheet (illmod 600); Mar. 2, 2007; 4 pages.

Westinghouse Savanah River Company; Design Proposal for Sealing Gap at Z-Area Saltstone Vault One, Cell A (U); 6 pages; Jul. 26, 1994; Aiken, South Carolina, available at http://pbadupws.nrc.gov/docs/ML0901/ML090120164.pdf, indexed by Google.

Stephan, Beth A; Non-Final Office Action for U.S. Appl. No. 15/681,500; dated Mar. 20, 2018; 7 pages; USPTO; Alexandria, Virginia.

Agudelo, Paola; Non-Final Office Action for U.S. Appl. No. 15/885,028; dated Mar. 30, 2018; 7 pages; USPTO; Alexandria, Virginia.

UFP Technologies; Polyethylene Foam Material; Dated Jan 8, 2012; retrieved from https://web.archive.org/web/20120108003656/http://www.ufpt.com:80/materials/foam/polyethylene-foam.html on Mar. 7, 2018; 1 page.

Stephan, Beth A; Non-Final Office Action for U.S. Appl. No. 15/884,553; dated Mar. 7, 2018; 7 pages; USPTO; Alexandria, Virginia.

* cited by examiner

JOINT SEAL SYSTEM

CROSS-REFERENCE TO RELATED APPLICATIONS

This application is a continuation of U.S. patent application Ser. No. 14/630,125, Joint seal system, filed Feb. 24, 2015 which is incorporated herein by reference, and claims the priority of U.S. Provisional Patent Application No. 61/946,311, filed Feb. 28, 2014 for "Joint Seal System," which is incorporated herein by reference.

STATEMENT REGARDING FEDERALLY SPONSORED RESEARCH OR DEVELOPMENT

Not Applicable.

BACKGROUND

Field

The present disclosure relates generally to systems for creating a durable seal between adjacent panels, including those which may be subject to temperature expansion and contraction or mechanical shear. More particularly, the present disclosure is directed to providing an integral multilayer joint seal system against one or more of water, fire, sound, air, smell, radiation, resistant and/or heat.

Description of the Related Art

Construction panels come in many different sizes and shapes and may be used for various purposes, including roadways, sideways, and pre-cast structures, particularly buildings. Use of precast concrete panels for interior and exterior walls, ceilings and floors, for example, has become more prevalent. As precast panels are often aligned in generally abutting relationship, forming a lateral gap or joint between adjacent panels to allow for independent movement, such in response to ambient temperature variations within standard operating ranges, building settling or shrinkage and seismic activity. Moreover, these joints are subject to damage over time. Most damage is from vandalism, wear, and environmental factors, where the seal may become thick and inflexible or are fragile. As a result, "long lasting" in the industry refers to a joint likely to be usable for a period greater than the typical lifespan of five (5) years. Various seals have been created in the field.

Various seal systems and configurations have been developed for imposition between these panels to provide seals which provide one or more of fire protection, waterproofing, and air insulation. This typically is accomplished with a seal created by imposition of multiple constituents in the joint, such as silicone application, backer bars, and compressible foams.

These systems, however, often fail due to the differences in compression and expansion of the various constituents, or the lack of bonding between layers, or because the system is directed to a particular purpose, such as water-resistance, but is exposed to fire, causing the seal system to fail and permit water to migrate behind the seal system. Vandalism, normal wear and environmental exposure can change or defeat the properties of the exposed surface coating or membrane. There is also the case where the best material or barrier may not be used because it is aesthetically unpleasing or cannot easily be colored. By moving the membrane feature to an internal level sufficient to protect it and allow for the best properties of the joint sealant, these limitations can be overcome and the useful lifespan extended.

Additionally, in some cases the movement of the joint may be limited, sometimes to only twenty-five percent (+/−25%) in compression and expansion, for a total movement of only fifty percent (50%). These systems often use closed-cell, rather than open-cell, polyurethane foams. The need exists for a seismic joint having a fifty percent (50%) movement in each direction, for a movement total of one hundred percent (100%).

It would be an improvement to the art to provide a joint seal system which would include a plurality of compressible layers joined into a single unit prior to imposition and which includes a membrane barrier positioned intermediate two compressible layers. It would be further improvement to provide the various compressible layers with differing waterproofing and/or fire rating properties.

Additionally, for joints greater than the one (1) inch size, typically of pre-compressed joint sealants with a silicone face, a myriad of potential failure risks exist. Typically the surface coating of these joints is relatively thin and can be damaged. Where joint substrate is irregular, a complete seal at the joint face might not be accomplished. Water intrusion from behind the joint face could find its way into or past the joint sealant and may result in poor performance or a leak, particularly problematic is products that rely on water-based intumescent surface coating, which can delaminate if subject to continuous moisture.

It would therefore be an improvement to safeguard the critical functions, by way of membrane barrier or the membrane barrier separating different operations of the foam, away from the surface where they can be damaged or bypassed. Thus, the joint seal surface will serve its primary aesthetic function of filling the joint with a matching or pleasing color without having the primary purpose of the system (water, fire etc) subject to failure from superficial damage.

Additionally, foam sealants can take a compression set at some point. If the foam sealant systems designed based on laminations (acrylics or strong pressure sensitive adhesives's in particular) are parallel to the joint substrate, they tend to separate over time, losing their sealant properties. The norm for these pressure sensitive adhesives impregnated systems is to use multiple, parallel laminations that are held together by their own adhesive force. These types of systems rely heavily on the clastomer surface coating for sealing and intumescent surface coatings for fire resistance. If there is any damage to the thin (60 mil or less coating) the system will not perform as designed. This is further complicated by the use of the multiple laminations that if separated would let water, smoke or fire penetrate the system. Failure of any of these listed shortcomings will reduce the useful lifespan of the joint sealant.

Because the primary sealant is always subject to adhesive, cohesive and environmental forces and therefore tends to wear out over time and leak, it is a good practice to have redundant systems.

Therefore, it would be an improvement to provide a joint seal with its own redundancy, particularly with regard to compression of foam seals.

Finally, it would be an improvement to provide a joint seal having a laminated or profiled lamination structure that could benefit from the push pull function of the joint.

SUMMARY

The present disclosure therefore meets the above needs and overcomes one or more deficiencies in the prior art by providing a joint seal system which provides a plurality of compressible layers, which may have different fire rating properties, joined into a single unit prior to imposition and which includes a barrier intermediate the plurality of compressible layers.

The disclosure provides a multi-layer joint system wherein layers of foam, layered co-planar to the adjacent surface, are interspersed with a barrier layer. The foam layers may be uncompressed or partially compressed at the time of joint seal formation and may be composed of an open cell, closed cell or hybrid foam impregnated or infused with a pressure-sensitive adhesive, which could be acrylic, styrene butadiene rubber (SBR), rubber, wax, asphalt or others apparent to those experienced in the trade, or an unprocessed open or closed, or hybrid, cell foam. A foam may be impregnated with a fire retardant, if at all, or may be composed of a fire retardant material, if desired. The barrier may have a tensile strength greater than the adjacent foam (which may be much greater). The joint seal may have an elastomer, such as silicone, at its top and/or bottom, and may even include an elastomer layer within the barrier.

The joint seal therefore includes a first body of compressible foam, a second body of compressible foam, and a barrier adhered to both the first body of compressible foam and the second body of compressible foam, wherein all three components have equivalent lengths and widths and are aligned to provide common ends.

The joint seal is constructed by providing a first body of compressible foam, providing a second body of compressible foam, providing a barrier, adhering the barrier to the first body of compressible foam at the first body bottom, and cutting the first body of compressible foam, the second body of compressible foam, and the barrier to provide a common first end, a common second end, a common first side and a common second side.

In an alternative embodiment, the joint seal includes a first body of compressible foam, a second body of compressible foam, and a barrier adhered to both the first body of compressible foam and the second body of compressible foam, wherein the foam bodies have equivalent lengths and widths but the barrier extends beyond the edge of the first body of compressible foam on at least one side, which may turned up or down and adhered to the foam or the substrate, or which may be driven into adjacent joint systems or may be overlaid adjacent substrates before being covered with substrate materials or other covering.

The present invention thus provides redundancy, and potentially a status notification of change in critical joint conditions in situ for water-resistant, fire-resistant and/or roof expansion joints.

Additional aspects, advantages, and embodiments of the disclosure will become apparent to those skilled in the art from the following description of the various embodiments and related drawings.

BRIEF DESCRIPTION OF THE DRAWINGS

So that the manner in which the described features, advantages, and objects of the disclosure, as well as others which will become apparent, are attained and can be understood in detail; more particular description of the disclosure briefly summarized above may be had by referring to the embodiments thereof that are illustrated in the drawings, which drawings form a part of this specification. It is to be noted, however, that the appended drawings illustrate only typical preferred embodiments of the disclosure and are therefore not to be considered limiting of its scope as the disclosure may admit to other equally effective embodiments.

In the drawings.

DETAILED DESCRIPTION

Figure 1:
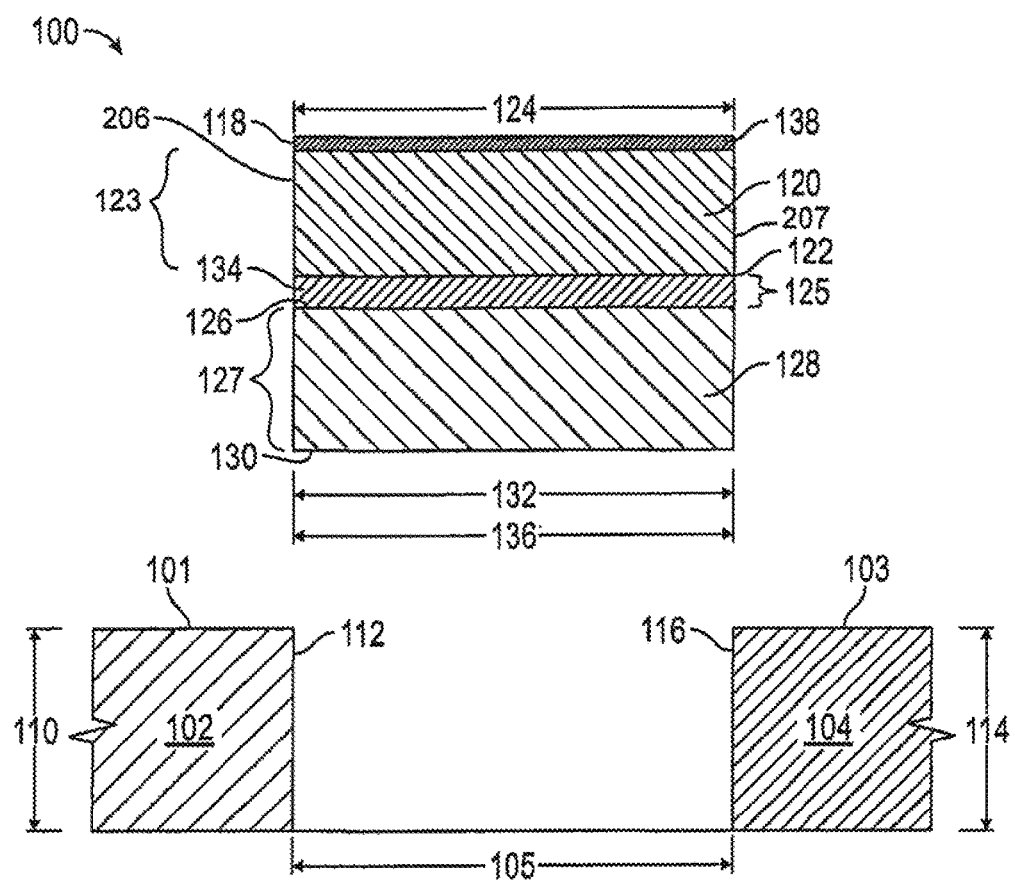
FIG. 1 is an illustration of a side view of the expansion joint seal system of the present disclosure.
Figure 2:
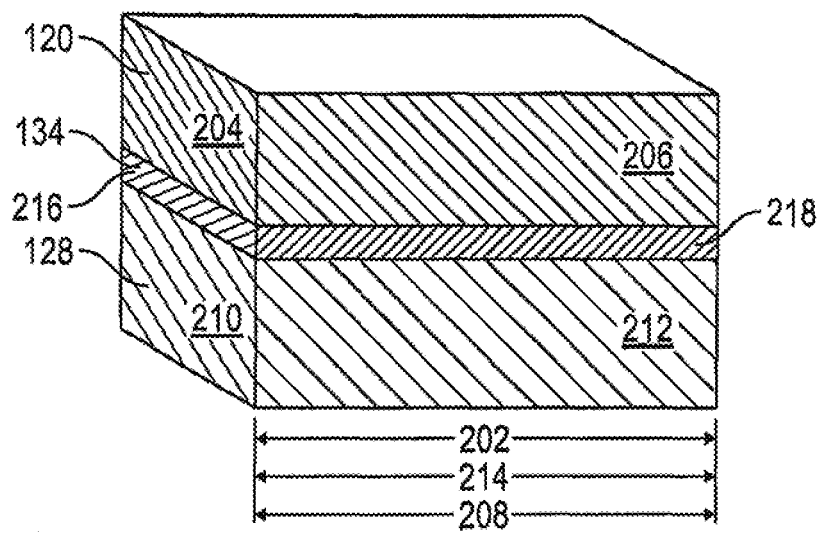
FIG. 2 is an illustration of an isometric view of the expansion joint seal system of the present disclosure.

Referring to FIGS. 1 and 2, a joint seal 100 is provided for imposition under compression between a first substrate 102 and a second substrate 104 separated by a distance 105. The joint seal 100 includes a first lateral body of compressible foam 120, a second lateral body of compressible foam, and a lateral barrier 134, which are joined together to form an integral unit prior to the imposition under compression between the first substrate 102 and the second substrate 104. The formation of the joint seal 100 as an integral unit prevents the failure typically seal at such joints where a component of the joint system has separated from the joint and partly, or entirely, migrated out of the joint between the two substrates.

Consistent with this purpose, the first body of compressible foam 120 is sized for use in the joint seal system, specifically to extend laterally from a first substrate 102 to a second substrate 104, and therefore has a first body top 118, a first body bottom 122, a first body length 202, a first body first end 204, a first body width 124, a first body first side 206, and a first body second side 207. The first body of compressible foam 120 may be an open-celled foam, a closed-celled foam, or a hybrid foam. The first body of compressible foam 120 may be impregnated with a fire retardant, if at all, or may be composed of a fire retardant material, if desired. The first body width 124 is sized to the distance 105 between the first substrate 102 and the second substrate 104 so as to contact the first substrate 102 at the body first side 206.

Similarly, the second body of compressible foam 128 is sized for formation of an integral unit with the first body of compressible foam 120 and to extend laterally from a first substrate 102 to a second substrate 104. The second body of compressible foam therefore has a second body top 126, a second body bottom 130, and a second body length 208, a second body first end 210, a second body width 132, and a second body first side 212. The second body of compressible foam 128 may be an open-celled foam, a closed-celled foam, or a hybrid foam. The second body of compressible foam 128 may be impregnated with a fire retardant, if at all, or may be composed of a fire retardant material, if desired. The second body width 132 is sized to the distance 105 between the first substrate 102 and the second substrate 104.

While the first body of compressible foam 120 has a first body fire rating, and the second body of compressible foam 128 has a second body fire rating, the first body fire rating need not be the same as the second body fire rating. Moreover, while this first body of compressible foam 120 provides a primary sealant layer, it can be altered as a result of any water which permeates into it, as this changes is properties, thus fire-rating properties may differ in case of water penetration, a circumstance which must be accounted for in any testing regime. Fortunately, because the second body of compressible foam 128 is protected from water penetration by the barrier 134, the fire-rating properties of the second body of compressible foam 128 are not also compromised. A body's fire rating may include the temperature at which the body burns, or flame spreads, or, in conjunction with or as an alternative thereto, the time-duration at which a body passes any one of several test standards known in the art. In one embodiment, the first body fire rating is unequal to the second body fire rating. Selection of the fire rating for the various layers of the joint seal 100 may be made to address operational issues, such as a high fire rating for the first layer, which will be directly exposed to fire, but which may provide limited waterproofing, coupled with a second body of compressible foam 128 which may have a lower fire rating, but a higher waterproofing rating, to address the potential loss of the first body of compressible foam 120 in a fire.

Detection of a compromised primary seal, the first body of compressible foam 120, may be addressed by the inclusion in the joint seal of radio frequency identification devices (RFIDs), which are known in the art, and which may provide identification of circumstances such as moisture penetration and accumulation. The inclusion of an RFID in the joint seal 100 may be particularly advantageous in circumstances where the joint seal 100 is concealed after installation, particularly as moisture sources and penetration may not be visually detected. Thus, by including a low cost, moisture-activated or sensitive RFID above or atop the barrier 134, the user can scan the joint seal 100 for any points of weakness due to water penetration. The barrier 134 may include a heat sensitive RFID, thus permitting identification of actual internal temperature, or identification of temperature conditions requiring attention, such as increased temperature due to the presence of fire, external to the joint or even behind it, such as within a wall.

Fires that start in curtain walls are catastrophic. High and low pressure changes have deleterious effects on the long term structure and the connecting features. Providing real time feedback from sensors, particularly given the inexpensive cost of such sensors, in those areas and particularly where the wind, rain and pressure will have their greatest impact would provide benefit. While the pressure on the wall is difficult to measure, for example, the deflection in a pre-compressed sealant is quite rapid and linear. When used, the temperature sensing function of the barrier 134 may be extended by use of a heat-conductive material in or on the barrier 134 in communication with the RFID. Additionally, an RFID may be in connection with an electrically-conductive membrane 134, such that a break in the membrane 134 may be immediately detected as a result of a change in conductivity. This may be accomplished by a copper membrane, a scrim, or mesh. A Faraday cage or shield may therefore also be used to limit electrical interference. Additionally, an RFID could be selected which would provide details pertinent to the state of the Leadership in Energy and Environmental Design (LEED) efficiency of the building. Additionally, such an RFID, which could identify and transmit air pressure differential data, could be used in connection with masonry wall designs that have cavity walls or in the curtain wall application, where the air pressure differential inside the cavity wall or behind the cavity wall is critical to maintaining the function of the system. RFIDs may be positioned in other locations within the joint seal 100 to provide beneficial data. An RFID may be positioned within first body of compressible foam 120 at or near the first body top 118 to provide prompt notice of detection of heat outside typical operating parameters, so as to indicate potential fire or safety issues. Such a positioning would be advantageous in horizontal of confined areas. An RFID positioned within first body of compressible foam 120 at or near the first body top 118 might alternatively be selected to provide moisture penetration data, beneficial in cases of failure or conditions beyond design parameters. In both cases, the RFID provides notice of exposure from the surface of the joint seal 100 most distant from the base of the joint. Alternatively, or in addition, an RFID can be positioned at or near the second body bottom 130 of the second body of compressible foam 128 to provide the same data (fire or water penetration) from the side most distant to the surface sealed. Further, RFIDs could be positioned at or near each end 204 of the first body of compressible foam 120 and/or the second body of compressible foam 128 so as to communicate relative position to the RFID positioned in the adjacent joint seal 100, such as where butt ends are spliced together, so as to identify any separation, or misalignment, of adjacent joint seals 100. Similarly, an RFID may be selected which provides notice of RF loss.

With the first body of compressible foam 120 and the second body of compressible foam 128, the joint seal 100 includes a barrier 134, positioned intermediate the first body of compressible foam 120 and the second body of compressible foam 128 so as to be laterally aligned with each and to extend laterally from at or near a first substrate 102 to at or near a second substrate 104. So as to be sized with the first body of compressible foam 120 and the second body of compressible foam 128, the barrier 134 has a barrier length 214, a barrier width 136 a barrier first end 216, and a barrier first side 218. The relative thickness of each body 120, 128 and of a barrier 134 is dependent on the compositions selected for each layer, the overall thickness of the joint seal 100, and the operating width of the joint seal 100. In the preferred embodiment, the thickness of the bodies do not vary by more than fifty percent (50%) from one another, and no barrier is less than twenty-five percent (25%) of the thickness of the thinnest body 120, 128.

Preferably, the second body of compressible foam 128 is twice the thickness of the first body of compressible foam 120, which has the benefit of moving the barrier 134 closer to the surface where the barrier 134 can better transfer loads, particularly when wider than the first body of compressible foam 120.

The barrier 134 includes a layer of a heat barrier, an infrared barrier, a high tensile barrier, a water barrier, air barrier and/or or a vapor barrier. In cases of wider pre-compressed foam-based expansion joints, the barrier 134 may be formed of a heavy duty membrane, having an increased thickness and durability to provide beneficial support for such wider joints, particularly horizontal joints up to twelve inches (12") in width, This structure provides improved durability to a known problem in the art regarding wide joints, particularly traffic joints, which must sustain pedestrian and vehicular traffic and the highly concentrated forces associated with such traffic, such as, for example, small or narrow heels. A barrier 134 having a thickness of at least 0.03 inches (30 mil) better supports transfer loads such as cart wheels and foot traffic and provides durability comparable to use of a cover plate or assembly of spline and cover plate. The profile cut illustrated in FIG. 6, for example, is particularly beneficial in electromagnetic field (EMF) applications. Typically in such situations, the type of copper foil associated with the EMF shielding fatigues and fails after a small number of cycles if required to randomly self "accordion" or flex within the foam. A barrier 134 of copper foil having a thickness of at least 0.1875 inches or a copper scrim ten (10) inches by ten (10) inches provides cycling durability equivalent to that experienced over five years of thermal cycling.

The membrane barrier is important for secondary containment applications where the joint is unattended for long period but must perform in an emergency. If the exposed surface is damaged or worn out it will fail. The internal sealing membrane barrier will be protected and will serve its intended function. The barrier 134 is sufficient to preclude penetration under intended operating conditions, such that a barrier for a one-hour rated fire-resistant expansion joint provides a sufficient barrier to ensure, together with the other components, including the various bodies and any other barriers, that the joint seal passes the applicable test used to determine the fire-rating.

By laminating in a coplanar orientation, the foam of the first body 120 or the second body 128 is not separated by the normal cyclical movement of the joint like is possible/common with parallel laminations under compression and extension cycling. In some embodiments, no stretching or tension is placed on the membrane barrier design so it may be installed such that it is never under tension. The membrane barrier would always be wider than or at least equivalent to the joint into which it is installed in or in the case of a rigid barrier such as a copper EMS system it would be smaller and the foam edges would compress and expand.

In the first embodiments of the joint seal 100, these various dimensions are generally equivalent. The first body length 202, the barrier length 214 and the second body length 208 are generally equivalent for provide a common length. Similarly, the first body width 124, the barrier width 136, and the second body width 132 are generally equivalent for provide a common width.

To form the integral whole, the barrier 134 is adhered to the first body of compressible foam 120 at the first body bottom 122, the barrier 134 is adhered to the second body of compressible foam 128 at the second body top 126. This may be accomplished by use of a conventional adhesive. The group of the first body first end 204, the second body first end 210, and the barrier first end 216 are co-planar, and the group of the first body first side 206, the second body first side 212, and the barrier first side 218 are also co-planar.

When installed, the joint seal 100 provides advantages over the prior art. When installed, the joint seal 100 is compressed between the first substrate 102 and the second substrate 104, such that each side of the joint seal 100 is in contact with an exposed side 112, 114 of the first substrate 102 and the second substrate 104. While the joint seal 100 may be maintained in place with adhesive on its sides, some water resistance is provided as a result of the joint seal 100 remaining in some compression after installation. The joint seal 100 is selected for use where at least the first body width 124 is greater, absent any lateral forces on the joint seal 100, than the distance or gap 105 between the exposed side 112 of the first substrate 102 and the exposed side 116 of the second substrate 104. The joint seal 100 is laterally compressed and in positioned in the gap between the first substrate 102 and the second substrate, and preferably below, or equivalent with, one or both of the top surface 101 of the first substrate 102, a distance 110 above the bottom of the gap 105, and the top surface 103 of the second substrate 104, a distance of 114 above the bottom of the gap 105. As the first body width 124 is greater than the distance or gap 105 between the exposed side 112 of the first substrate 102 and the exposed side 116 of the second substrate 104, the joint seal 100 remains in compression. The lateral forces attempting to return to the joint seal 100 to the uncompressed, original state, cause the joint seal 100 to remain in place and for any adhesive to remain in full contact with the sides 112, 116 of the substrates 102, 104.

When exposed to fire, the first body of compressible foam 120 may be partially, or entirely, consumed by fire, but the barrier 134 prevents the fire from consuming the second body of compressible foam 128, such that when fire suppression equipment is used, the first body of compressible foam 120 may be blown out of the joint, but the remaining second body of compressible foam 128 and barrier 134 prevent water or other materials from entering the joint between the panels, which could otherwise require removal of the panels.

The joint seal 100 may further include an elastomer 138, such as silicone, adhered to the first body top 118 and/or to the bottom of the bottom-most layer, the second body bottom 130 in the first embodiment.

Figure 3:
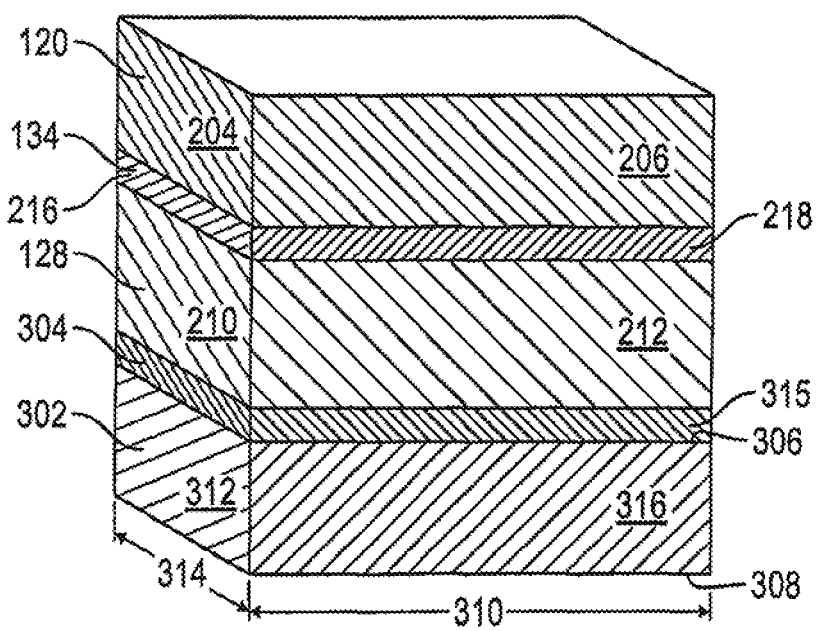
FIG. 3 is an illustration of a side view of an alternative expansion joint seal system of the present disclosure.

Referring now to FIG. 3, in another embodiment, the joint seal 100 may further include a third body of compressible foam 302 and a second barrier 304. In this embodiment, the third body of compressible foam 302 includes a third body top 306, a third body bottom 308, a third body length 310, a third body first end 312, a third body width 314, and a third body first side 316. The first body length 202 and the third body length 310 are equivalent, and the first body width 124 and the third body width 314 are equivalent. In this embodiment, the second barrier 304 is adhered to the second body of compressible foam 128 at the second body bottom 130 and is adhered to the third body of compressible foam 302 at the third body top 306. The second barrier 304 would include a layer of a heat barrier, an infrared barrier, a high tensile barrier, a water barrier, air barrier and/or a vapor barrier, which need not be identical to the barrier 134. The first body first end 204 and the second barrier first end 315 are co-planar, and the first body first side 206 and the second barrier first side 318 are co-planar. The relative thickness of the third body of compressible foam 302 and of the second barrier 304 is likewise dependent on the compositions selected for each layer, the overall thickness of the joint seal 100, and the operating width of the joint seal 100. In the preferred embodiment, the thickness of the third body of compressible foam 302 does not vary by more than twenty-five percent (25%) from the other bodies, and the second barrier 304 is less than twenty-five percent (10%) of the thickness of the thinnest body 120, 128, 302.

The barrier 134 and the second barrier 304 need not be a solid when adhered to the respective bodies of compressible foam, but may be a liquid, including or separate from, the adhesive. Moreover, the embodiment of FIG. 3 may be constructed with the equivalently-sized profile cut for the first body of compressible foam 120, the barrier 134, the second barrier 304, the second body of compressible foam 128, and the third body of compressible foam 302, while the second barrier 304 may utilize the wing 602 and sinusoidal shape depicted in FIG. 6. As a result, a barrier which is between 0.1875 and 0.325 inches wide but the same height allows for a barrier thickness of up to 0.06 inches (60 mils). Where a barrier, whether the barrier 134 or a second barrier 304, is formed of rigid copper, particularly a rigid copper barrier formed in a sinusoidal shape, it is advantageous for each body of compressible foam 120, 128 abutting the barrier to formed to the same sinusoidal shape so that the components mesh together. Thus, the second barrier 304 may be set in nosing or concrete, or supplied with an adhesive on the ends or underside of the second barrier 304 to facilitate the installation of the joint seal 100 in deep joint substrates.

The joint seal 100 is constructed by providing a first body of compressible foam 120, providing a second body of compressible foam 128, providing a barrier 134, adhering the barrier 134 to the first body of compressible foam 120 at the first body bottom 122, and cutting the first body of compressible foam 120, the second body of compressible foam 128, and the barrier 134 to provide a common first end, a common second end, a common first side and a common second side.

The method of construction may further include providing a third body of compressible foam 302, providing a second barrier 304, adhering the second barrier 304 to the second body of compressible foam 128 and to the third body of compressible foam 302, and cutting the third body of compressible foam 302 and second barrier 304 at the common first end, at the common second end, at the common first side and at the common second side.

Once these components are joined into an integral unit, the joint seal 100 may be cut to length and compressed and imposed between the first substrate 102 and the second substrate 104. The integral unit provides advantages after the prior art. Because the components are joined into the joint seal 100 prior to installation, the dimensions of the components are equal, providing a full edge on each surface, avoiding the potential of exposed surfaces and permitting better joining at the butt of each joint seal 100. Moreover, because the components are joined prior to installation in the gap, a complete adhesion between each component and the adjacent component is obtained, rather than the potential for air gaps between components and avoiding the potential for any offset in the actual gap, which could frustrate performance. Additionally, because the components are made integral before installation in the gap, the barrier is assured to be in the correct position, such that destruction of the top body of compressible foam is destroyed or rendered inoperable, the barrier maintains its function.

Additionally, the first body of compressible foam 120, the second body of compressible foam 128, and where present, the third body of compressible foam 302 may be provided with different compression ratios. Different compression ratios would facilitate the installation process and allow for compression ratios to be used that were previously unachievable in a single compression ratio system, such as where the first body of compressible foam 120 may have a lower compression ratio, while other bodies of compressible foam may have higher compression ratios, resulting in a joint seal 100 which is more watertight at the bottom, while more flexible on the top. As can be appreciated, this structure may be reversed for different properties.

Figure 4:
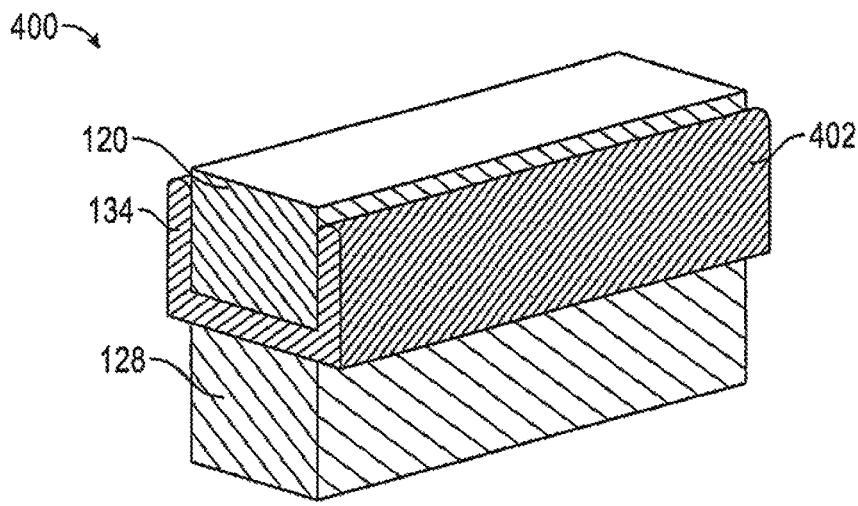
FIG. 4 is an illustration of a further alternative expansion joint seal system of the present disclosure.

Referring now to FIG. 4, in an alternative embodiment 400, the joint seal includes a first body of compressible foam 120, a second body of compressible foam 128, and a barrier 134 adhered to both the first body of compressible foam 120 and the second body of compressible foam 128, wherein the compressible bodies have equivalent lengths and widths but the barrier extends beyond the edge of the first body of compressible foam 120 on at least one side to provide a wing 402 can be turned up (or down) and adhered, at installation, to the substrate 102, 104. Additionally, a slow drying adhesive may be applied to the wing 402 before insertion. Traditional, faster drying adhesive, such as epoxy, are to be avoided as they can cure before insertion.

Figure 8:
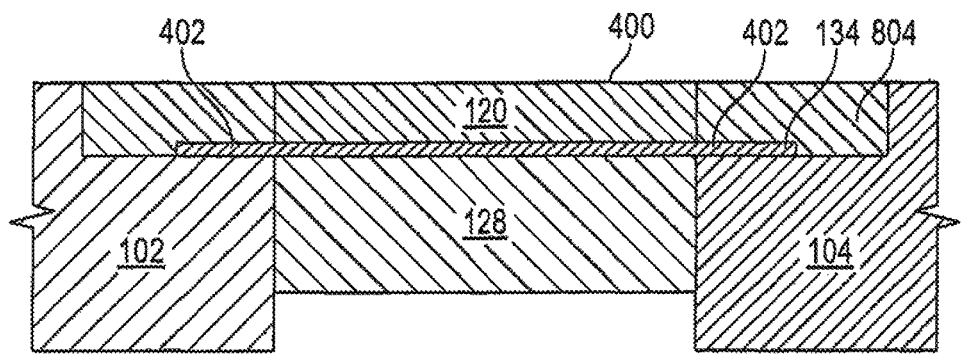
FIG. 8 is an illustration of the further alternative expansion joint seal as installed together with a polymer nosing.

This embodiment allows the barrier 134 to extend past the compressible body laminations and be used as wing 402 to be set into the concrete substrate 102 or polymer nosing 804, as illustrated in FIG. 8. This is helpful for split face concrete or application where it is desirable to extend the properties of the barrier 134 past the edge of the joint substrate 102, 104.

Figure 5:
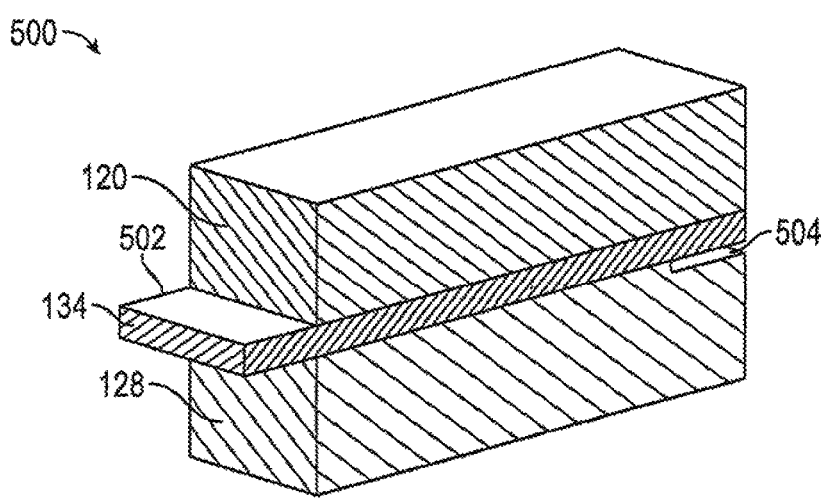
FIG. 5 is an illustration of a further alternative expansion joint seal system of the present disclosure.

Referring to now to FIG. 5, a further alternative embodiment 500 of the joint seal 100 is illustrated. In the further alternative embodiment 500, the barrier 134 protrudes beyond an end of the joint seal 100, providing a tab 502. The barrier 134 may not be adhered to either the first body of compressible foam 120 or to the second body of compressible foam 128 and an opposing end, or potentially at both ends of the joint seal 100, providing a separable gap 504. As a result, the tab 502 of one unit of the joint seal 100 may be inserted into the end of an adjacent joint seal 100 in the separable gap 504. The length of the tab 502 and the distance of separable gap 504 may be as much, or even more than, two inches. For example, a sixty (60) inch length of joint seal 500 may include a three (3) inch tab 502 and a matching length gap 504 where the lamination of the first body 120, the barrier 134, and the second body 128 are bonded together, so that unbonded tab 502 may be inserted and joined, such as with an adhesive on one or both of its top and bottom, to provide a continuous and overlapping joint system. An adhesive seal may be used on each tab 502 or in each separable gap 504 to tie adjacent joint seals 100 together so as to provide a continuous barrier along the length of the joint. This resolves a weakness, which may be substantial, of joint unions in joint construction and common cause of failure, which is usually accomplished only by bonding the butt ends of the joint seals 100 together.

Figure 6:
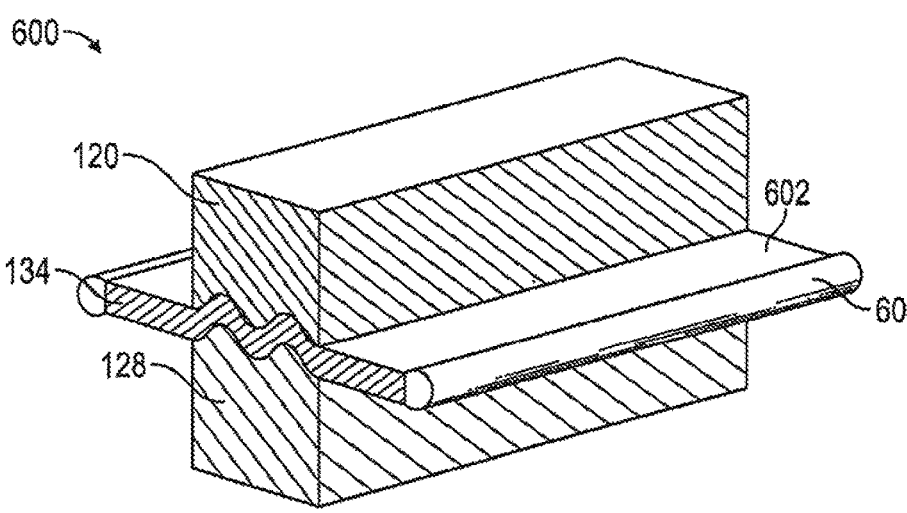
FIG. 6 is an illustration of a further alternative expansion joint seal system of the present disclosure.

Referring now to FIG. 6, in another further alternative embodiment of the joint seal 600, the barrier 134, which could be installed with a sinusoidal structure to encourage deformation and rebounding, could extend outside the edges of the first body 120 and the second body 128 to provide a wing 602 to use an anchoring device and/or a continuation of the beneficial properties of the barrier 134. An example would be using a water and fire resistant foam as the first body 120 with a thick durable reinforced rubber or other similar water barrier barrier 134 with a less-water resistant but more fire resistant foam as the second body 128. The rubber barrier 134 would be too thick to compress such that it would work well as a moving joint seal but by using the integral sinusoidal pattern for the barrier 134, the first body 120 and the second body 128 can compress and work as a joint sealant. The rubber barrier 134 would extend past the edge of the first body 120 and the second body 128 such that it could be set into a polymer nosing or concrete or act as part of a split slab barrier. This reduces the likelihood that water can move past the joint sealant 100 even if the top seal generated by the first body 120 fails or the concrete spalls at the edge of the joint. This is additionally helpful because the second body 128 can be selected for higher fire resistance and with lower waterproofing requirements. The wing 602 may include at its edge an anchor 603 of increased thickness.

Figure 7:
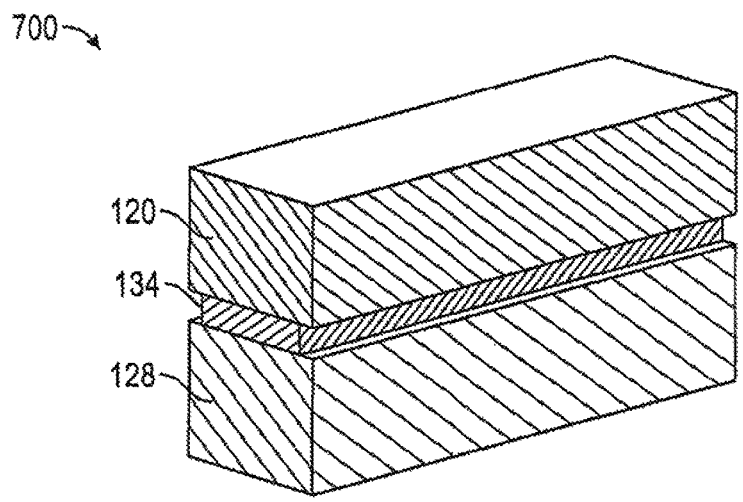
FIG. 7 is an illustration of a further alternative expansion joint seal system of the present disclosure.

Referring now to FIG. 7, in another further alternative embodiment 700, the barrier 134 may be of a narrower width than the first body 120 and the second body 128. Thus, the barrier 134 may terminate short of the edge of the first body 120 and the second body 128. This variation allows for the benefit of the different foams for the first body 120 and the second body 128 and also allows for the barrier 134 to accept less compression while still providing its intended properties.

In connection with each embodiment, cutting the first body 120 and the second body 128 into interlocking (male/female) sections using a radius of at least 0.1875 inches permits a thicker barrier 134 to be used without bowing or deformation of the foam, a benefit previously available only when a thin barrier 134 might be used. In the prior art, use of a random accordion style would cause the barrier 134 to fatigue after cycling.

An example is a joint seal using two different fire-rated foams as the first body 120 and the second body 128 adhesively bonded together with a barrier 134 of copper foil to block EMF radiation. A barrier 134 of copper would not be as flexible as the foam of the first body 120 and the second body 128 and would benefit from the sides of the first body 120 and the second body 128 compressing before the barrier 134 of copper would need to compress or flex. The resultant joint sealant 700 would serve to provide a fire resistant material required in sound booths, studios, and concert halls, and offer the benefit of the barrier 134 of copper serving as flexible (compressible) EMF blocking device.

This use of the method would have other uses obvious to those familiar with the trade to provide a flexible or compressible medium or joint for materials that are fragile or too rigid to allow for movement over an expansion joint. A variation to this method for materials that are thick or would require a higher degree of movement would be to cut the foam in such a pattern to allow for the barrier to bend or flex in a wave type pattern. For smaller, thinner barriers the foam is typically resilient and compressible enough to allow for the variation in the barrier. For thicker or more rigid barriers it has been found better to cut the foam into a wavy or zig-zag pattern such that the two sections of foam nest into each other (or male-female sections). Thereafter the barrier is adhered to both sections such that when the resulting joint material is compressed the barrier folds with the foam and allows for greater joint movement than if affixed as a thick straight barrier. Another use of this method is to solve the problem of foam joint sealant densities and separating foams with competing properties. Such is the use of one layer that is designed to be hydrophobic (some may be slightly to keep out a driving rain other more so for standing water) in its function or not all and the second layer is designed to be hydrophilic. In this case the waterproof (and maybe radon proof) barrier separates the hydrophilic layer that will absorb water or moisture increasing its internal compressive force to stop water penetration but does so in a variable method so some water can penetrate before it has expanded enough to seal the joint. This is undesirable and can lead to mold in confined spaces. The first layer can be designed to work as intended and offer a dry exposed surface area.

Preferably and unlike the prior art, the present disclosure permits a joint movement of +/−50%, i.e. 100% total, of Class I, II, III Movement per ASTM E-1399 while serving in joints up to 12" wide as a self-supporting horizontal system.

The foregoing disclosure and description is illustrative and explanatory thereof. Various changes in the details of the illustrated construction may be made within the scope of the appended claims without departing from the spirit of the invention. The present invention should only be limited by the following claims and their legal equivalents.

What is claimed is:

1. A joint seal, comprising,
a first substrate and a second substrate separated by a distance;
a first body of compressible foam, the first body of compressible foam having a first body top, a first body bottom, a first body length, a first body first end, a first body width, a first body first side, a first body second side, the first body width extending from the first body first side to the first body second side, the first body width sized to the distance between the first substrate and the second substrate, the first body of compressible foam contacting the first substrate at the body first side and the second substrate at the first body second side;
a second body of compressible foam, the second body of compressible foam having a second body top, a second body bottom, and a second body length, a second body first end, a second body width, a second body first side, a second body second side, the second body width extending from the second body first side to the second body second side, the second body width sized to the distance between the first substrate and the second substrate so as to directly contact the first substrate at the second body first side and the second substrate at the second body second side;
a flexible barrier, the barrier having a barrier length, a barrier width, a barrier first end, a barrier first side and a barrier second side, the barrier width greater than the first body width and the second body width, the barrier including a wing extending beyond a first body first side or a second body first side,
the barrier adhered at a barrier first surface to the first body of compressible foam at the first body bottom from the first body first side to the first body second side, the barrier first surface and the barrier second surface being coplanar from the barrier first side to the barrier second side, the barrier having an edge at the barrier first side from the barrier first surface to the barrier second surface, the barrier adhered at a barrier second surface to the second body of compressible foam at the second body top from the second body first side to the second body second side, the barrier including a layer from at least one of a heat barrier, an infrared barrier, a barrier having a tensile strength greater than a tensile strength of the first body of compressible foam and greater than the tensile strength of the second body of compressible foam, a water barrier, air barrier and a vapor barrier;
wherein the wing of the barrier near the barrier first end is adapted to fold to contact one of the first body first side at the barrier first side and the second body first side at the barrier second side;
the first body first end and the second body first end being co-planar;
the first body first side and the second body first side being co-planar; and
the first body second side and the second body second side being co-planar.

2. The joint seal of claim 1, wherein the barrier further includes a tab extending beyond the first body first end and wherein the barrier length is equivalent to the first body length.

3. The joint seal of claim 1, further comprising:
an elastomer adhered to the first body top.

4. The joint seal of claim 1, wherein the first body of compressible foam has a first body fire rating and the second body of compressible foam has a second body fire rating, the first body fire rating and the second body fire rating being unequal.

5. The joint seal of claim 1 further comprising:
a third body of compressible foam, the third body of compressible foam having a third body top, a third body bottom, a third body length, a third body first end, a third body width, and a second body first side,
the first body length and the third body length being equivalent,
the first body width and the third body width being equivalent, and
a second barrier adhered to the second body of compressible foam at the second body bottom, the second barrier adhered to the third body of compressible foam at the third body top, the second barrier including a layer from one of a heat barrier, an infrared barrier, a barrier having a tensile strength greater than a tensile strength of the first body of compressible foam and greater than the tensile strength of the second body of compressible foam, a water barrier, air barrier or a vapor barrier.

6. The joint seal of claim 1 further comprising:
the first body length, the barrier length and the second body length being equivalent.

7. The joint seal of claim 1 further comprising:
the first body first end and the barrier first end being co-planar.

8. The joint seal of claim 1 further comprising:
the second body first side and the barrier first side being co-planar.

9. The joint seal of claim 1 further comprising:
the first body of compressible foam being impregnated with a fire retardant composition delivered in a liquid medium.

10. The joint seal of claim 1 further comprising:
the first body of compressible foam being composed of a fire retardant medium.

11. The joint seal of claim 1 further comprising:
the second body of compressible foam being impregnated with a fire retardant composition delivered in a liquid medium.

12. The joint seal of claim 1 further comprising:
the second body of compressible foam being composed of a fire retardant medium.

13. The joint seal of claim 1 further comprising:
a radio frequency identification device providing data on at least one of moisture content, temperature and manufacturing details, in contact with one of the first body of compressible foam, the second body of compressible foam, and the flexible barrier.

14. The joint seal of claim 13 wherein the barrier is one of heat-conductive and electrically-conductive.

15. The joint seal of claim 1, further comprising:
a slow drying adhesive applied to the wing extending beyond the first body first side.

16. The joint seal of claim 1, further comprising:
the barrier having a thickened edge.

17. The joint seal of claim 1 further comprising:
a radio frequency identification device within one of the first body of the compressible foam and the second body of compressible foam, the radio frequency identification device identifying at least one of moisture penetration, heat, and air pressure.

18. The joint seal of claim 1 further comprising:
a radio frequency identification device at one of the first body first end and the second body first end, the radio frequency identification device identifying at least one of moisture penetration, heat, and air pressure.

19. The joint seal of claim 1 wherein the barrier is electrically-conductive and further comprising:
a radio frequency identification device sensitive to both moisture and heat in contact with the barrier.

20. The joint seal of claim 1 wherein the barrier includes one of a copper foil, a copper scrim, and a copper mesh.

21. The joint seal of claim 20 wherein the barrier is a Faraday cage.

22. The joint seal of claim 20 wherein
the barrier length is less than the first body length and the second body length, the barrier first end not protruding beyond the first body first end and not co-planar with the first body first end, and the barrier second end not protruding beyond the first body first end and not co-planar with the first body first end.

23. The joint seal of claim 20 wherein the barrier further includes a tab extending beyond the first body first end and wherein the barrier length is equivalent to the first body length.

24. The joint seal of claim 1 further comprising:
one of the first body of compressible foam and the second body of compressible foam being composed of a fire retardant closed cell foam.

25. The joint seal of claim 1 further comprising:
one of the first body of compressible foam and the second body of compressible foam being composed of an open cell foam and one of the first body of compressible foam and the second body of compressible foam being composed of a closed cell foam.

26. The joint seal of claim 1 further comprising:
the first body of compressible foam having a first body thickness,
the second body of compressible foam having a second body thickness,
wherein the first body thickness is not more than one half the second body thickness.

27. The joint seal of claim 1 wherein
the first body of the compressible foam has a first body water resistance, and the second body of the compressible foam has a second body water resistance, the first body water resistance and the second body water resistance being unequal.

28. The joint seal of claim 1 wherein the first body of the compressible foam has a first compression ratio, and the second body of the compressible foam has a second body compression ratio, the first body compression ratio and the second body compression ratio being unequal.

29. The joint seal of claim 1 wherein at least one of the first body of compressible foam and the second body of compressible foam is a partially-closed cell hybrid foam impregnated with one of an acrylic, styrene butadiene rubber, rubber, wax, asphalt, and pressure-sensitive adhesive.

30. The joint seal of claim 1 wherein at least one of the first body of compressible foam and the second body of compressible foam is an unprocessed partially closed cell hybrid foam.

31. The joint seal of claim 1 further comprising:
an elastomer layer within the barrier.

32. The joint seal of claim 1 further comprising:
the barrier between the first and second foam body having a thickness of at least 0.03 inches.

33. The joint seal of claim 1 wherein the first body bottom and the second body top present corresponding interlocking non flat surfaces.

34. The joint seal of claim 1 wherein at least one of the first body of compressible foam and the second body of compressible foam is hydrophobic.

35. The joint seal of claim 1 wherein at least one of the first body of compressible foam and the second body of the compressible foam is hydrophilic.

36. The joint seal of claim 1 wherein at least one of the first body of the compressible foam and the second body of the compressible foam is at least partially impregnated with a liquid hydrophobic sealing composition.

37. The joint seal of claim 1 wherein at least one of the first body of the compressible foam and the second body of the compressible foam is at least partially impregnated with a liquid hydrophilic sealing composition.

* * * * *